(12) United States Patent
Thönnes

(10) Patent No.: US 6,443,681 B1
(45) Date of Patent: Sep. 3, 2002

(54) THREADED COMPONENT WITH A TOOL-FITTING REGION

(75) Inventor: Theo Thönnes, Darscheid (DE)

(73) Assignee: Ideal-Standard GmbH, Bonn (DE)

( * ) Notice: Subject to any disclaimer, the term of this patent is extended or adjusted under 35 U.S.C. 154(b) by 0 days.

(21) Appl. No.: 08/619,699

(22) PCT Filed: Sep. 17, 1994

(86) PCT No.: PCT/EP94/03117

§ 371 (c)(1),
(2), (4) Date: Mar. 27, 1996

(87) PCT Pub. No.: WO95/09308

PCT Pub. Date: Apr. 6, 1995

(30) Foreign Application Priority Data

Sep. 30, 1993 (AT) .............................. 93 A1971

(51) Int. Cl.[7] ................................................ F16B 23/00
(52) U.S. Cl. ........................ 411/410; 411/402; 411/427
(58) Field of Search ................. 411/3, 5, 119, 411/402, 403, 404, 410, 427, 910, 919

(56) References Cited

U.S. PATENT DOCUMENTS

| 3,444,775 A | * | 5/1969 | Hills | 411/3 |
| 3,765,098 A | * | 10/1973 | Schafer, Sr. | 33/601 |
| 4,022,086 A | * | 5/1977 | Ramsey | 81/116 |
| 4,189,976 A | | 2/1980 | Becker | |
| 4,267,870 A | | 5/1981 | Warner | |
| 4,890,967 A | * | 1/1990 | Rosenbaum | 411/377 |
| 5,123,310 A | * | 6/1992 | McManus | 81/125 |
| 5,302,069 A | * | 4/1994 | Toth et al. | 411/429 |

FOREIGN PATENT DOCUMENTS

| CH | 622862 | 4/1981 | | |
| DE | 3043429 | 7/1982 | | |
| EP | 0164318 | 12/1985 | | |
| EP | 0172130 | 2/1986 | | |
| FR | 2467312 | * 5/1981 | | 411/5 |
| GB | 2015 | of 1915 | | |
| GB | 0898026 | * 6/1962 | | 411/3 |
| GB | 2 261 483 | 5/1993 | | |

* cited by examiner

*Primary Examiner*—Robert G. Santos
(74) *Attorney, Agent, or Firm*—Herbert Dubno Andrew Wilford

(57) ABSTRACT

A fastener for use with inch and metric wrenches has a body unitarily formed with at least one screwthread, a pair of concentric faceted tool-fitting regions of different sizes, and a step between the regions. One of the regions corresponds to a metric wrench size and the other of the regions corresponds to an inch wrench size. The screwthread and both regions are coaxial.

6 Claims, 2 Drawing Sheets

THREADED COMPONENT WITH A TOOL-FITTING REGION

CROSS REFERENCE TO RELATED APPLICATIONS

This is the US national phase of PCT application PCT/EP94/03117 filed Sep. 17, 1994 with a claim to the priority of Austrian application A 1971/93 itself filed Sep. 30, 1993.

FIELD OF THE INVENTION

The present invention relates to a threaded component with a tool-fitting region. More particularly this invention concerns an internally or externally threaded fastener such as a screw, stud, or nut.

BACKGROUND OF THE INVENTION

A problem for the manufacture of machinery for use world wide is the use of different measurement systems, namely the metric and the English systems, in various countries. When the end user must assemble or repair the product, the manufacturer must equip the product with components that fit with the tools in the appropriate countries. This requires one to stock all the components that must fit with a tool in both the metric and English measurement system, at least for replacement parts.

In devices that are to be assembled it is frequently the case that the poorly equipped home handyman has an incomplete set of tools and uses a wrench that is too small or too big so that the tool-fitting region is damaged. When the equipment has to be repaired or taken apart the component is no longer removable and the purchaser will have been the cause of his own unhappiness.

OBJECTS OF THE INVENTION

It is an object of the invention to eliminate this disadvantage and provide a component provided with a screwthread that can be interfitted with tools of at least two different measuring systems, e.g. the metric as well as the English systems, or even with tools of two different sizes in the same measurement system.

SUMMARY OF THE INVENTION

This object is attained in that the workpiece has at least two different sections that are connected at a step and that have different dimensions for fitting with tools of different measurement systems.

Preferably the tool-fitting region has two regions of which one has dimensions corresponding to a standard metric tool and the other to an inch-type tool.

This tool-fitting region can be a hexagonal recess for an allen wrench or even the head for an external hex wrench.

In this manner it is no longer necessary to use different threaded components for different countries depending on whether the metric or English system is used there for tools. Producing the devices using these components and stocking these components is simplified. In order to assemble an apparatus for example in Germany a metric tool and in the US an inch tool can be used for the same component. The component can be tightened to the same torque. This is surely a substantial advantage.

In the case of dimensions corresponding to one measurement system, but different sizes for the tool-fitting region, the likelihood of having available an appropriately sized tool and of not damaging the tool-fitting region during assembly is increased as well as the possibility of later removal of the component.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
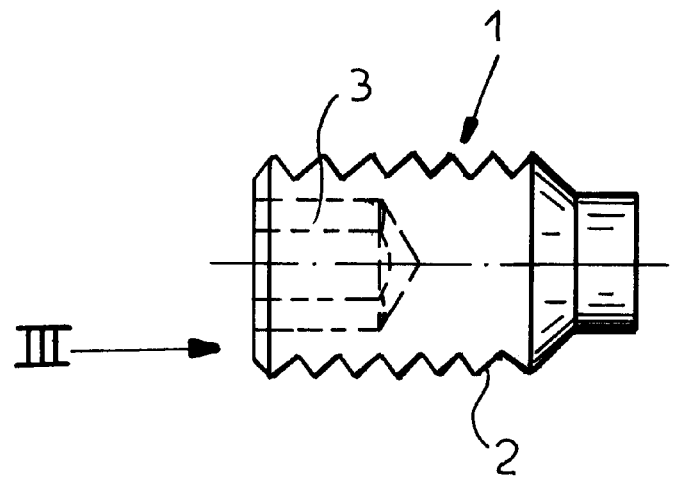
FIG. 1 is a side view of a component according to the invention.

The component shown in FIG. 1 is a threaded stud 1 with a screwthread 2 and an internal hexagonal formation 3 for fitting with an allen wrench.

Figure 2:
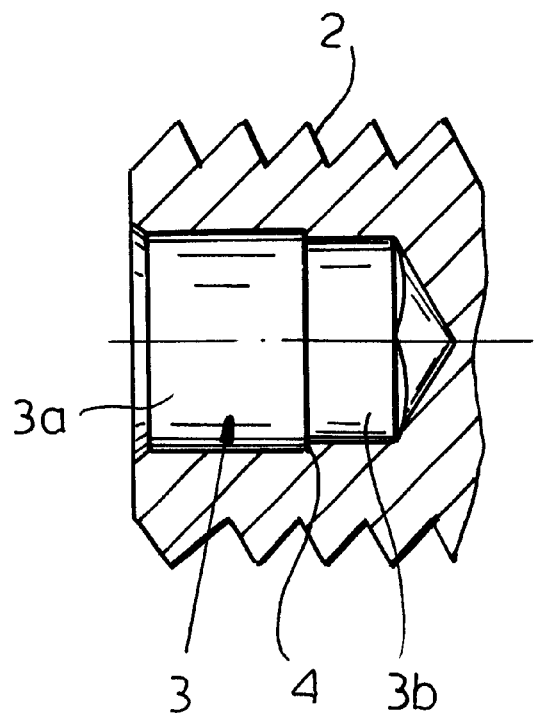
FIG. 2 is a large-scale axial section through a detail of the component of FIG. 1.

FIG. 2 shows that region of the threaded stud 1 which has the hexagonal recess 3 in section. One can see that the recess 3 has two sections 3a and 3b connected by a step 4. One of these sections, e.g. the outer section 3a, has a standard metric size and the other, here the inner section 3b, has a standard inch size. In order to screw in the threaded pin 1 one can use either a standard inch-type allen wrench that fits in the inner section 3b or a metric allen wrench that fits in the outer section 3a.

Figure 3:
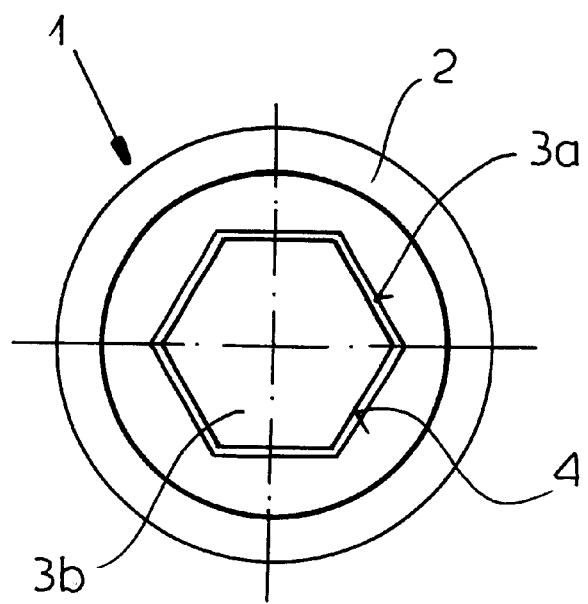
FIG. 3 is a view taken in the direction of arrow III of FIG. 1.

FIG. 3 shows the threaded pin 1 with the hexagonal recess 3 in top view. One can clearly see the wider outer section 3a and the narrower inner section 3b as well as the step 4 between them.

Figure 4:
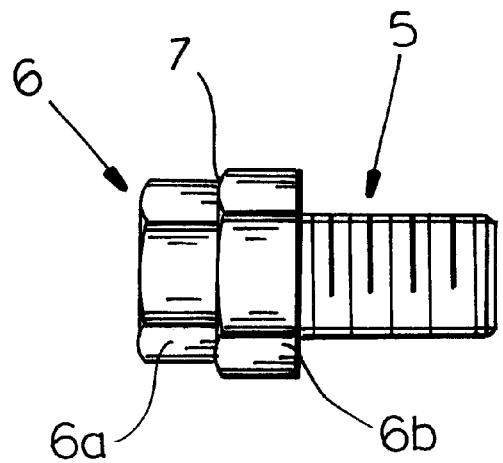
FIG. 4 is a side view of another component in accordance with this invention.

FIG. 4 shows a screw with a hexagonal head according to the invention. The screw head 6 has two sections 6a and 6b joined at a step 7 and of which the one, e.g. the outer section 6a, fits with a standard inch-type wrench and the other, here the inner section 6b, fits with a metric wrench. It is clear that as a result of the size of wrenches, preferably the hexagonal region with the smaller diameter is outward as illustrated.

Analogously the hexagonal head on a stud with internal threads or on a nut can be provided with two different sections for fitting with wrenches.

What is claimed is:

1. A fastener having a body unitarily formed with:
   at least one screwthread;
   a pair of concentric faceted tool-fitting formations of different sizes, one of the formations corresponding to a standard metric wrench size and the other of the formations corresponding to a standard English-system wrench size; and
   a step between the formations.

2. The fastener defined in claim 1 wherein the screwthread and both formations are coaxial.

3. The fastener defined in claim 1 wherein the body is formed with a recess having the formations, whereby the formations are internal formations intended to fit with an Allen wrench.

4. The fastener defined in claim 1 wherein the formations are externally directed.

5. The fastener defined in claim 1 wherein the formations are hexagonal.

6. The fastener defined in claim 1 wherein the formations and screwthread are centered on a common axis and the formations are externally directed, the one formation being larger than the other formation and being located between the other formation and the screwthread.

* * * * *